(12) United States Patent
Pirincci

(10) Patent No.: US 8,756,932 B2
(45) Date of Patent: Jun. 24, 2014

(54) JAY GRAVI-BUOYANT BALLS

(76) Inventor: Jay Pirincci, Sunny Isles Beach, FL (US)

( * ) Notice: Subject to any disclaimer, the term of this patent is extended or adjusted under 35 U.S.C. 154(b) by 244 days.

(21) Appl. No.: 13/373,371

(22) Filed: Nov. 14, 2011

(65) Prior Publication Data
US 2012/0159941 A1 Jun. 28, 2012

Related U.S. Application Data

(63) Continuation-in-part of application No. 12/321,968, filed on Jan. 27, 2009, now Pat. No. 8,112,992.

(51) Int. Cl.
*F03B 17/02* (2006.01)
*F03B 17/04* (2006.01)
*H02K 53/00* (2006.01)

(52) U.S. Cl.
CPC ............... *F03B 17/04* (2013.01); *Y02E 10/20* (2013.01); *H02K 53/00* (2013.01)
USPC .............................................. 60/496; 60/495

(58) Field of Classification Search
USPC ..................... 60/495, 496; 415/916
See application file for complete search history.

(56) References Cited

U.S. PATENT DOCUMENTS

| | | | | |
|---|---|---|---|---|
| 3,857,242 A * | 12/1974 | Gilmore | .......................... | 60/495 |
| 6,249,057 B1 * | 6/2001 | Lehet | ............................. | 290/1 R |
| 7,134,283 B2 * | 11/2006 | Villalobos | ........................ | 60/639 |
| 8,015,807 B1 * | 9/2011 | Akutsu | ............................ | 60/495 |
| 8,171,729 B2 * | 5/2012 | O'Briant | .......................... | 60/495 |

* cited by examiner

*Primary Examiner* — Christopher Jetton

(57) ABSTRACT

This is an energy or electricity generation process or system that converts mechanical energy into electrical energy comprised of a design using gas or air, liquid or water and solids in high, rectangular and sealed chambers where specially designed mainly solid, spherical, buoyant bodies, objects or devices circulate up and down using the full potential of gravity to drop down, activate a mechanism to initiate an alternator in one chamber and then employ the process and power of buoyancy in water in another chamber to lift back up to its original point at the top to start all over again circulating continuously wherefore supplying energy continuously.

19 Claims, 5 Drawing Sheets

JAY GRAVI-BUOYANT BALLS

RELATED APPLICATIONS

This patent application claims priority to, and continues-in-part from U.S. patent application Ser. No. 12/321,968, entitled "JAY GRAVI-BUOYANT BALLS," filed on Jan. 27, 2009 now U.S. Pat. No. 8,112,992.

BACKGROUND INFORMATION

Solids, liquids and gases have been used separately or in conjunction with each other in many types of moving systems in order to generate rotational mechanical energy. The three states of matter, solids, liquids and gasses provide the flexibility of their natural composition for efficient conversion to mechanical energy. The pumping or movement of gases and liquids have been used for the triggering or actuating of solids like a piston, lever, bar or switch etc. especially since it is much easier to move, operate or maneuver thru winding, obstructed and difficult to reach and control paths using flexible matter such as air and water rather than solids. They have been used together for movement depending on the situation, purpose and time. Conventional methods for energy or electricity gain using liquids require a water source to be located at a high altitude to provide a steep vertical fall such as a waterfall that is fed by a river or stream to be functional which will also necessitate the rerouting of rivers and the redesigning of the environment and terrain. Energy created by the use of coal, oil, natural gas, wood or other natural resources in furnaces will not only eventually run out as we are witnessing but will produce harmful gases as an end product which will be an endless abuse of the environment and the earth's surface. Solar panels, wind mills and other similar systems used that take advantage of the environment's natural forces are unreliable and inconsistent forms of energy that seem efficient and cost effective only when current methods such as oil become more and more expensive to operate if we do not consider the fact that these unattractive contraptions will have to cover the earth to provide enough energy for all our needs. There is a serious need for a clean, safe, efficient and let me add attractive system which can be sheltered or secluded underground or above that will not deplete the earth of its natural ingredients and pollute the environment with toxic concentrated recycled chemical elements.

SPECIFICATIONS—DESCRIPTION

The three natural states of matter, gas, liquid and solid all having their specific composition, position, function and purpose in space can be used in conjunction with each other to create energy. Their special arrangement in space used in a totally different manner and application compared to traditional designs has resulted in the creation of this invention. Specifically, buoyant, durable mainly solid and spherical bodies or objects of a certain weight, volume and density pass through a high altitude chamber with two doors called a transfer chamber whereby enhanced by the pull of gravity they drop and apply their mass to inflict a force upon a lever, bar or basket type mechanism or device driving it to rotate producing electricity from an attached generator and continuing on to drop into a water filled second chamber, a chamber at the bottom where the entering buoyant bodies float up through the water guided by a deflector into an attached water filled third chamber to float back up to its starting position from where it was originally released in the first chamber. Chamber one uses its two doors opening and closing in sequence to preserve the necessary air vacuum it has created in chamber one and the attached chamber three whereby preserving the high water level in chamber 3 which allows the buoyant balls to float upward back up to the top. In this system in order to insure the proper operation of the vacuum and to maintain the high water level in chamber three (without having to use any backup systems such as the doors in the beginning and end of chamber two explained later), it is essential that the liquid in chamber three extend all the way from the top of that chamber to the bottom of chamber two to create a bend filling it up to the top of chamber two in the beginning where the spherical objects enter thereby holding the liquid in place and preventing it from sinking any lower and flowing back up into chamber one.

When the falling spherical buoyant objects are released from the levers or handles they are driving, they drop from a pre-designed height that would cause them to enter the bottom water filled second chamber dropping low enough to deflect off a diverter panel and rise towards the attached third chamber by their buoyancy and by another upwardly sloping deflection panel.

In the first chamber, as the spherical objects enter from chamber three, the first door opens and closes behind them followed by a second door where the objects or bodies exit and continue to pass through rolling down the extended platform with tension clips to control their timing where finally dropping down to drive a lever and chain assembly that turns an attached alternator. As the objects continue on to drop into chamber two, they are diverted to rise using their buoyancy in liquid into chamber three and back up to the top to start the process all over again circulating continuously without disruption.

The buoyant spherical objects take advantage of the gravitational pull on one side to drive an alternator while taking advantage of the composition of the liquid to defy gravity by their buoyancy and float up through the liquid to the top on the other side to create a continuous and constant circulating motion producing an uninterrupted supply of electricity.

If it is proven to be efficient, there are another set of rotating levers in chamber three similar to chamber one to drive the same generator as the spherical objects float upward to generate electricity.

There are standby or back up systems also available especially if there is a malfunction in the opening and closing of the two doors in the transfer chamber at the top in chamber one or if it is determined to be inefficient.

The first is in case there is a malfunction in the doors of chamber one where there are two standby doors at the bottom in chamber two that will be able to hold the water at the same level (which will also reduce the amount of energy required to open and close the doors in the transfer chamber) on top of chamber three by closing after the buoyant spherical objects have passed through into chamber three and remaining closed until new objects are released from the rotating mechanism to be accepted into chamber two.

The second is using the two standby doors to trigger the injection of compressed air into chamber one to again maintain the high water level in chamber three and keep the water low in chamber two creating another transfer chamber for the passage of spherical bodies;
Where now both systems will be available to allow the passage of spherical bodies and objects from one chamber to another without effecting water levels, all adding to the efficient functioning of the process and invention.

In addition, once the liquid is at the desired level at the top of chamber three, if the buoyant bodies are not able to continue to jump high enough onto the platform of chamber three from the drag of water, a punch on the side of the chamber is used to push them onto the platform. Another available standby system in case the spherical bodies are not able to jump onto the platform is an inlet to fill the top of chamber three with a liquid floating the buoyant bodies to the top and then releasing the liquid with a drain at the bottom of the platform into a water storage container below to cause the spherical bodies to descend back onto the platform and roll down into chamber one and continue on through to drop off the edge.

The doors in transfer chamber one at the top and the doors in chamber two at the bottom, if and when they are used in chamber two as a backup, open in sequence allowing the passage of the buoyant spherical bodies and objects but also closing after their passing to prevent the seepage or movement of air pressure or liquid between the chambers to preserve the vacuum that will maintain the necessary constant high water levels in chamber three in order for the bodies or objects to circulate whereas, dropping down from chamber one into the water fined chamber two on one side and floating back up in chamber three on the other side to continue around again.

To continue the process without disruptions of electricity production, another exact setup with chambers and a rotating mechanism is attached side by side where when spherical bodies are rolling slowly on top dropping down to the 2nd chamber at the bottom on one side, more buoyant bodies in an attached setup are floating to the top and filling chamber one on top on the other side. Both sides have rotating mechanisms that are attached to a generator on each end as their common connection.

Using gravity's potential to the fullest the following ingredients or variables can be adjusted to determine the dimensions needed in the mechanism in order to attain the specific watts or power desired:

The mass or weight, volume and density of the mainly solid, spherical bodies and objects to drive the rotating mechanism that create the mechanical energy for electricity production will determine the size of the chambers and devices in the invention as they maneuver and circulate between its sections.

The height at which the bodies and objects are dropped and the frequency of the drops.

Finally, the strength and proper functioning of the doors in one chamber controlling and preserving the vacuum that will maintain the height and amount of water in the attached chamber.

The dynamics discovered in this patent is the use of these three simple states of matter—air or gas, water or liquid and solids to create a phenomenon where in one chamber, buoyant, spherical bodies or objects will use the gravitational force to drop and accelerate impacting a lever mechanism to generate electricity and in another attached chamber to defy that same gravitational force long enough for these buoyant bodies and objects to float and reach the original starting height to once again use gravity to its fullest potential completing the motion or loop to start all over again.

This gravitational force not only has existed since the beginning of time but it is always available everywhere, at all times without searching, discovering, mining and redesigning the earth or the environment. It is the force that keeps everything together and in tact. We know its power, what its capable of and that it is always there, everywhere, all the time. Mass or weight has a huge amount of energy behind it when it is coupled with the pull, speed and acceleration of gravity where it then can be the supply for an endless amount of energy.

This invention will bring science closer to a Perpetual motion machine that produces electricity.

This is what has been disclosed in this document.

SUMMARY OF INVENTION

The purpose of the invention is to provide a clean, green and simple system that will generate electricity anytime and anywhere without the constraints of geography, the limitations of climate and the time of day using as few ingredients as possible applying only the general nature of the three states of matter: gas, liquid, solid and the one force that binds them all—gravity.

In this system, Buoyant Bodies or Objects of any size drop down off the bottom of Chamber "1" driving a rotating mechanism attached to a alternator to generate electricity into Chamber "2", Deflect over by Diverters floating up to enter into Chamber "3" and float upward continuously one after another driving another set of rotating levers with little energy wasted for their lift thereby producing constant energy or electricity from their continuous drops in Chamber "1" and continuous lifts in Chamber 3 no matter what size or at what height, anywhere, anytime merely by the adjustment of their weight, volume and height level, the three variables that will determine energy production.

What is significant in this system is that the lift needed for an object of any weight and size to reach any height level and then drop from that height to produce the desired amount of electricity requires no energy. Since gravity is always available and requires no energy to produce, lift will also require no energy. Lift, which is the energy required to propel a weight to a specific height for a desired drop that will result in the desired power output may seem inefficient using a solid instead of more flexible states as gas and liquid but if that required lift force and if possibly the reduction in efficiency is free without any effort or waste of energy and with virtually no change on the environment, it has no significance. Once lift is available without any effort for free thru this system, all that is necessary for any required amount of energy or electricity production is to merely adjust the amount of weight and height. A downward fall and speed of a mass or weight can last as long as the force of gravity permits minus the friction of the generator shaft depending on the height of the fall or drop. Therefore in determining power, the weight, the height and the coasting or float in the generation of electricity has to be taken into consideration when determining the frequency of drops minus the power needed to operate the doors and their sensors in the Transfer Chamber, chamber 1, in chamber 2 necessary, the inlet valve for more water and air if necessary and the punch in Chamber "3" if necessary.

This invention or system can be implemented from now on for energy or electricity production without any further need for environmental alterations or chemical interactions finally promoting a safe and green environment.

These devices can be installed by simply excavating in any field, yard, underneath a building foundation, in any home owners basement or yard or in any commercial buildings, low or high, incorporated in the structure's center similar to an elevator shaft or underneath below ground level. It can also be installed or constructed on the ground similar to a building if so desired. Power plants can be constructed anywhere without disrupting the terrain with unattractive buildings and machinery polluting the environment with coal or any other material used in firing furnaces and rotating turbines or worse disrupting and rerouting our rivers for dams or still yet unreliable windmills and solar panels and other contraptions covering the earth.

Plants can be established in any location neatly secluded underground or disguised as a simple residential building above ground. The power output for power plants can be determined by increasing the size and weight of the circulating bodies or objects, increasing their height of fall, attaching them together or by creating a long cylinder that would achieve the same results depending on the output desired.

If a lake or pond could be sealed off or only its edges where all along its shoreline this device was installed and connected to maintain the water level without allowing it to decrease in height in an attached chamber, a fully functioning and circulating energy production unit can be created.

If the earth had a hole excavated from one side to the other thru its center with this system attached, the bodies would drop back and forth from one side to the other rotating a mechanism such as a revolving chain forever by the earth's gravitational pull producing an endless supply of energy and electricity.

DESCRIPTIVE EXAMPLES SIZE

An applicable size for the above example is a 4'-0" wide× 8'-0" long×60'-0" high machine dependant on size and weight of the buoyant, spherical objects or balls which may be many.

Plants can be established in any location that has the space ranging from 300'-0" in length and height, and 30'-0"-50'-0" in width neatly hidden underground or disguised as a simple residential building above ground.

Power Plants can be created by increasing the size and weight of the objects (balls) attaching them together or creating a long cylinder that would achieve the same results. Cylindrical or attached spherical bodies that will be used in large plants will vary in weight from 1,000 lbs to 100,000 lbs on up. Bear in mind that the large windmills which are becoming a part of the electrical grid constructed in open vacant land have a bulk or mass of approximately 32 tons or 72,000 pounds to 100 tons or 200,000 pounds or more.

DESCRIPTION OF THE DRAWINGS

Legend 1-3
FIG. 1—Side elevation of the invention
FIG. 2—Side elevation with doors in chamber 1 at the top closed and chamber 3 filled with water.

LEGEND

Figure 1:
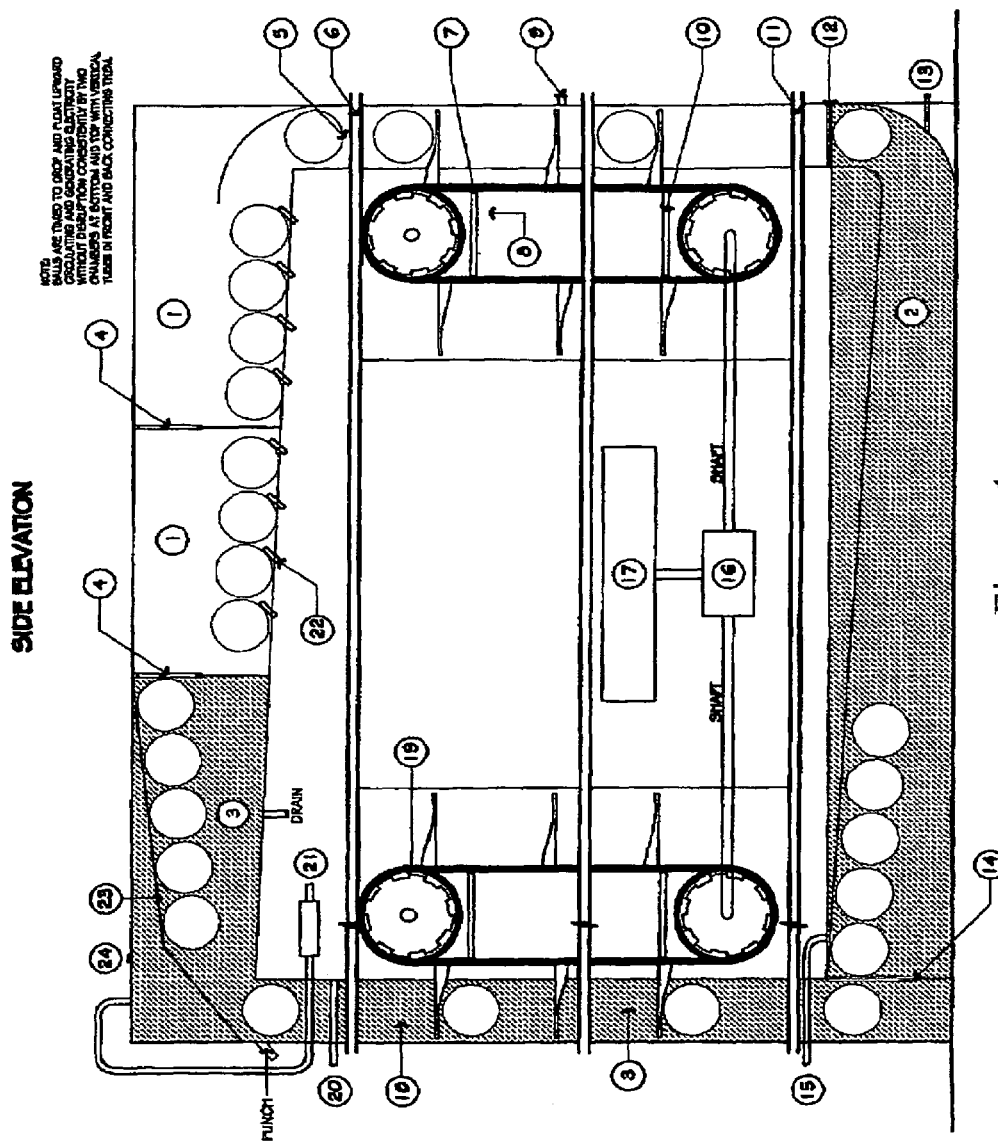
Figure 2:
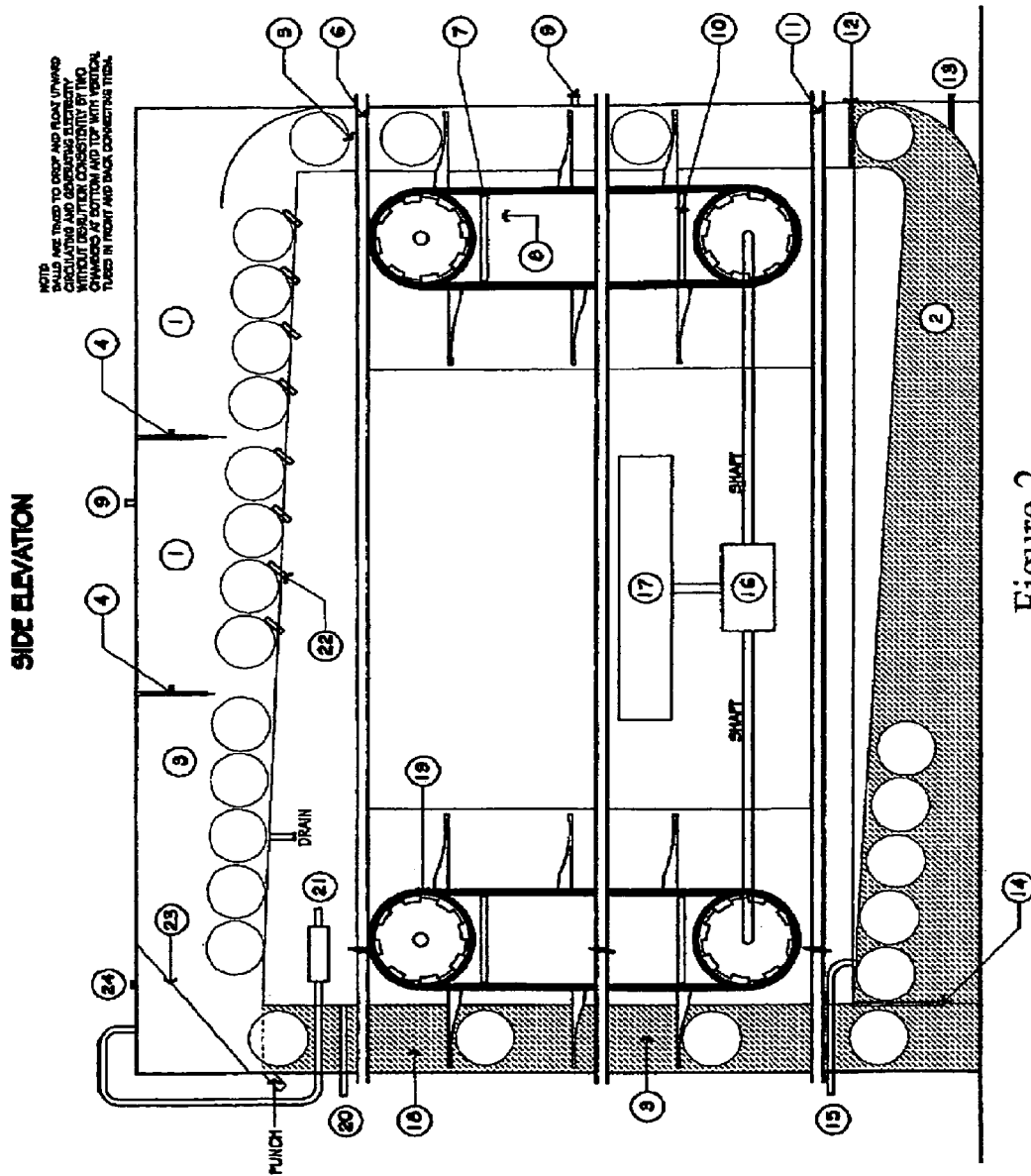
Figure 3:
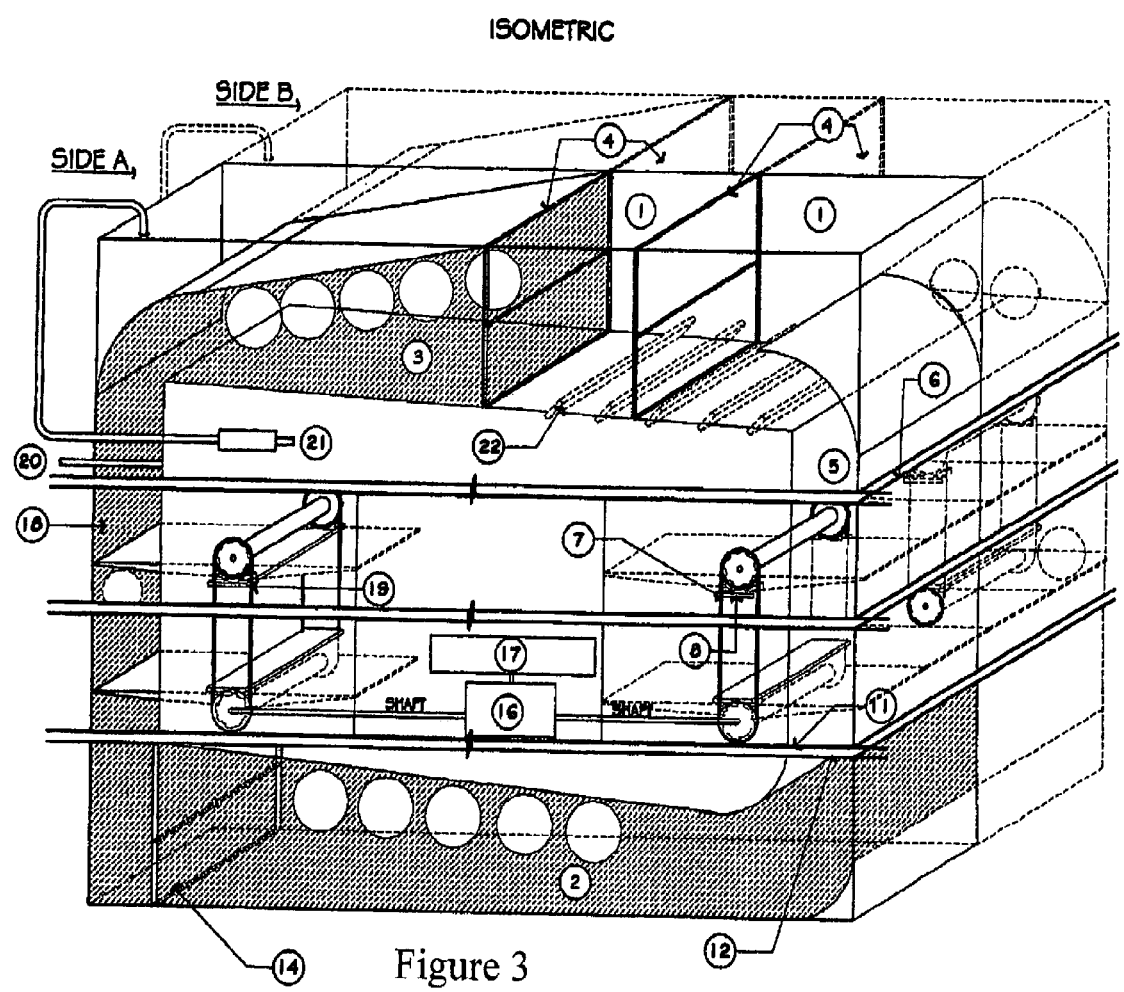
FIG. 3—Isometric view of the invention.
Figure 4:
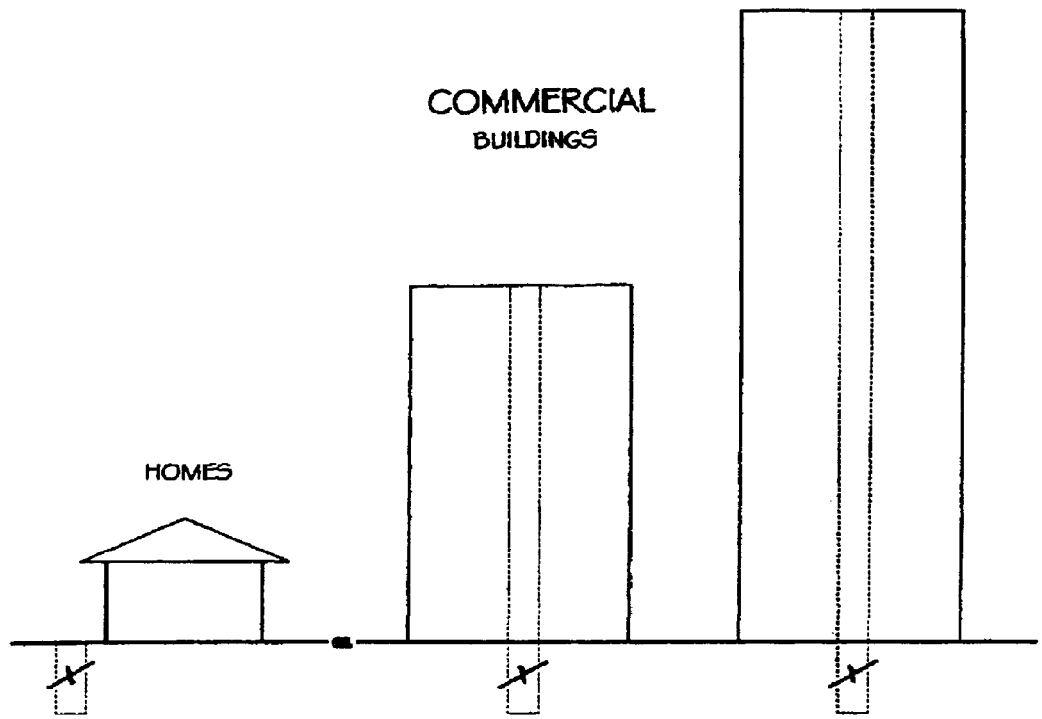
FIG. 4 Applied to residential and commercial buildings.
Figure 5:
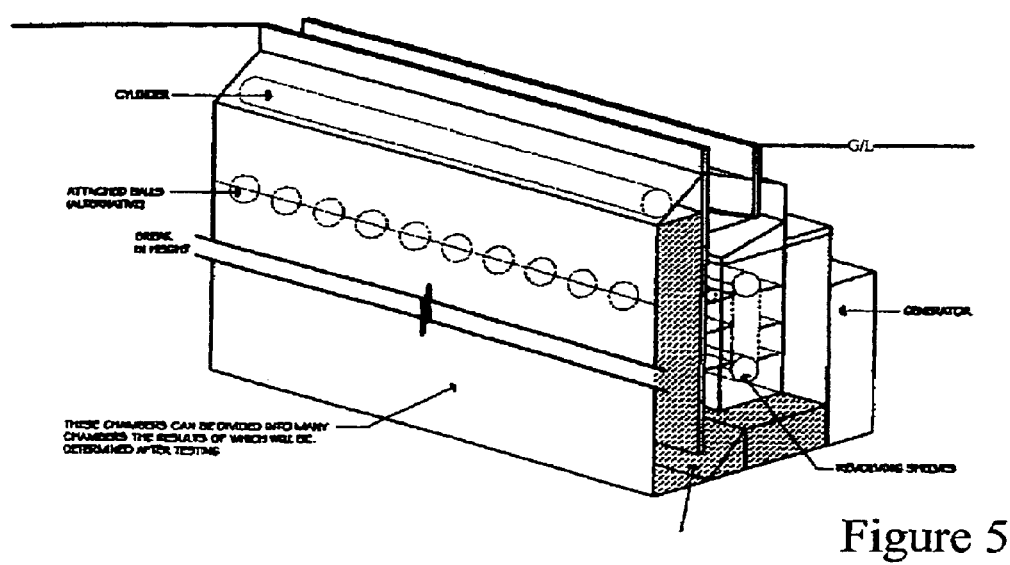
FIG. 5 Power plant design
FIG. 6 Lakeside application for power plant
FIG. 7 Earth Hole
Figure 6:
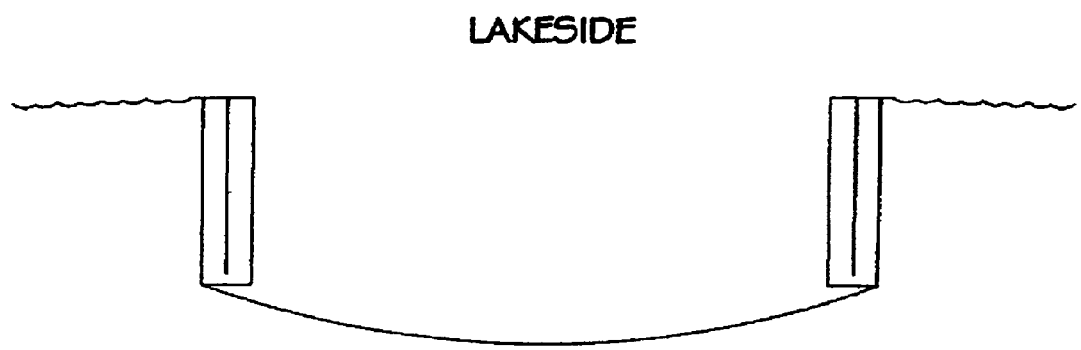
Figure 7:
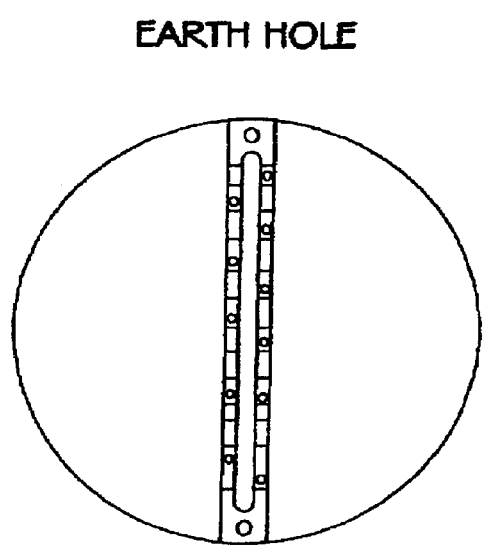

| NUMBER | DESCRIPTION |
|---|---|
| 1 | CHAMBER 1 |
| 2 | CHAMBER 2 |
| 3 | CHAMBER 3 |
| 3A DESCRITION OF PROCESS ONLY - NOT ON DIAGRAM | AT THE TOP OF CHAMBER 3, AS BACKUP, IN CASE THE BUOYANT SPHERICAL OBJECTS CANNOT JUMP ONTO PLATFORM ON THEIR OWN AND IF THE PUNCH IS NOT EFFICIENT, THERE IS AN INLET TO FILL CHAMBER TO TOP WITH LIQUID TO RAISE THE LEVEL OF THE SPHERICAL OBJECTS INTO CHAMBER 3 AND A DRAIN TO RELEASE THE WATER AND LOWER THEIR LEVEL FOR THEM TO ROLL INTO CHAMBER 1 TO START THE PROCESS OVER AGAIN. (SEE FIG. 2) |
| 4 | IN CHAMBER 1 ON BOTH SIDES A & B, 2 DOORS ARE USED TO PRESERVE THE VACUUM AND THE HIGH WATER LEVEL IN CHAMBER 3 |
| 5 | GUIDEBOX FOR BALLS TO DROP |
| 6 | BREAK IN HEIGHT NOTE: ENOUGH HEIGHT FOR MAXIMUM GRAVITY TO LOAD AND CAUSE SHELVES TO REVOLVE BASED ON RPM |
| 7 | ATTACHED TO SIDE CHAMBER |
| 8 | REINFORCED BARS FOR REVOLVING SHELVES ATTACHED TO CHAIN ROLLING ON INDENTED BALLBEARING LINED TRACKS ATTACHED TO GENERATOR |
| 9 | AS BACKUP, IN CASE DOORS IN CHAMBER 2 FAIL, AN INLET IS USED FOR COMPRESSING AIR INTO CHAMBER 1 WHERE TOGETHER WITH DOORS ABOVE CHAMBER 1 IS SEALED OFF TO CREATE AN INCOMPRESSIBLE CHAMBER 1 IN ORDER TO MAINTAIN A HIGH WATER LEVEL IN CHAMBER 2 AND 3 |
| 10 | ATTACHED TO SIDE OF CHAMBER |
| 11 | BREAK IN HEIGHT NOTE: ENOUGH HEIGHT FOR BALLS TO DROP LOW ENOUGH IN WATER TO DIVERT INTO CHAMBER 2 AND THEN FLOAT UP TO CHAMBER 3 THRU DOOR |
| 12 | IN CASE DOORS IN CHAMBER 1 MALFUNCTION, THIS IS ANOTHER BACKUP SYSTEM OF SENSOR INDUCED DOORS THAT WILL OPEN & CLOSE IN SEQUENCE ALLOWING THE SPHERICAL OBJECTS TO ENTER AND EXIT WHILE HOLDING THE WATER LEVEL IN CHAMBER 2 AND 3 AT THE SAME HIGH LEVEL |
| 13 | DIVERTER AND DRAIN |
| 14 | IN CASE DOORS IN CHAMBER 1 MALFUNCTION, THIS A BACKUP SYSTEM OF SENSOR INDUCED DOORS THAT WILL OPEN AND CLOSE IN SEQUENCE ALLOWING THE SPHERICAL OBJECTS TO ENTER AND EXIT WHILE HOLDING THE WATER LEVEL IN CHAMBER 2 AND 3 AT THE SAME HIGH LEVEL |
| 15 | WATER SUPPLY |
| 16 | GEARBOX |
| 17 | GENERATOR |

-continued

| LEGEND | |
|---|---|
| NUMBER | DESCRIPTION |
| 18 | GUIDEBOX FOR BALLS TO FLOAT UPWARD |
| 19 | REVOLVING LEVERS CONNECTED TO GENERATOR (SAME AS #8) |
| 20 | WATER SUPPLY- HOUSE |
| 21 | PUMP AND WATER STORAGE AND DRAIN FOR A REUSABLE WATER SYSTEM |
| 22 | TENSION STOPS TIMED TO RELEASE DROP OF BALLS |
| 23 | DIVERTER (SAME AS IN CHAMBER 2)-- |
| 24 | WATER SUPPLY- - |

The invention claimed is:

1. A circulation system for generating electricity comprising two sides, each of said side comprising:
   a plurality of circulating spherical buoyant objects, wherein said spherical objects being composed of materials that maintain the same structure and chemical composition when released from a first chamber filled with air from a high altitude;
   said first chamber having a platform to keep said spherical objects, said first chamber having two standby standard, sensor induced, electrically actuated with counter weights entry doors;
   a first mechanism having a first set of levers or holders or containers located inside a tube, said mechanism being connected with an alternator;
   said tube connected with said first chamber for accepting said spherical objects failing down from said first chamber to activate said mechanism through said first set of levers to drive said alternator to produce desired electricity and power wattage;
   a second chamber at the bottom connected with said tube for accepting said spherical objects from said tube through an opening with a first door that is used only if necessary as backup, said chamber being filled with a liquid; said chamber having a side diverting panel and an upwardly sloping deflection panel for transferring said spherical objects to a third chamber;
   a bend section connecting said second chamber with said first chamber on one side and connecting said second chamber with said third chamber on other side;
   a second mechanism used only if proven to be efficient having a second set of levers located inside said third chamber and connected with said alternator,
   said third chamber being filled with liquid and connected with said second chamber through an opening with a second door that is used only if necessary as backup at the bottom thereof, and connected with said first chamber at the top;
   wherein said third chamber transfers said spherical objects by buoyancy force from the second chamber to the first chamber, thence to said platform back to the original position to start a new cycle; wherein said spherical objects drive said second mechanism through said second set of levers and said alternator wherein this mechanism is installed and used in said third chamber only if proven to be efficient;
   wherein said two entry doors of the first chamber open and close in sequence to allow the passage of the spherical objects between said third chamber and first chamber thereby preventing the seepage or passage of water and pressure between said first and second chambers by creating a vacuum in order to maintain a constant high water level in the third chamber for the buoyant spherical objects to rise and circulate;
   wherein the bend section filled with water helps insure and preserve the vacuum between first and third chamber to maintain the constant high water level in the third chamber;
   wherein said first and second doors of the second chamber are used only as a backup system in case doors in the first chamber malfunction, opening and dosing in sequence to allow the passage of the spherical objects between said second and third chambers thereby preventing the seepage or passage of water and pressure between said second and third chambers in order to maintain a constant high water level in the third chamber for the spherical objects to circulate;
   wherein an additional backup system is used further comprising a sensor activated inlet valve in said first chamber for a compressor arranged to inject compressed gas or air into said first chamber creating an equal balance to pressure the water in said second and third chambers to remain at the same high level in case failure of the doors in the second chamber causes the water levels in said second and third chamber to descend back up into the first chamber;
   wherein on the first side, the spherical objects roll down on top inside the first chamber and then drop to said second chamber, at the same time on the second side, the spherical objects in the second chamber are being released to float to the top thereby filling said first and third chambers; both sides have the rotating mechanism that generates electricity on each end as their only common connection.

2. The circulation system of claim 1, wherein said buoyant spherical objects are constructed of a durable non-corrosive materials.

3. The circulation system of claim 1, wherein said first chamber is located at a high altitude, wherein said two entry doors of the first chamber open and close in sequence to allow the passage of the spherical objects between said third chamber and first chamber thereby preventing the seepage or passage of water and pressure between said first and second chambers by creating a vacuum in order to maintain a constant high water level in the third chamber for the buoyant spherical objects to rise, pass and circulate;
   wherein said platform of first chamber has an inclined surface for directing said spherical objects down into said tube.

4. The circulation system of claim 1, wherein the system includes a rolling incline with tension clips providing a timed drop in coordination with the rotating mechanism below.

5. The circlulation system of claim 1, wherein the first chamber has a predetermined distance between the point of falling over the edge of the object from the platform and the height of the rotating mechanism, holder or lever receiving the impact in the tube below, for creating a more forceful impact by gravity and a smoother, consistent spin of the shaft which is attached to the alternator for maximum efficiency.

6. The circulation system of claim 1, wherein at least one of the mechanisms and levers or holders are spaced for maximum efficiency for further preventing of jamming between the objects and the mechanism receiving the impact.

7. The circulation system of claim 1, wherein a gearbox connected to the alternator or generator produces relatively low revolutions per minute to prevent jams between the objects and the receiving mechanism or levers.

8. The circulation system of claim 1, wherein the spherical objects have predetermined proportions of volume and mass for buoyancy continue on to fall to the bottom into the water in said second chamber, where the distance from the release of the body from the levers and the level of the water in said second chamber is high enough to cause the objects when dropped to submerge low enough below the top diverter panel and bounce off the side diverter panel to deflect toward said third chamber.

9. The circulation system of claim 1, the said standard, sensor induced, electrically actuated entry doors used for only backup is located at the bottom in the entry to the second chamber between the first chamber and the second chamber.

10. The circulation system of claim 1, wherein after the deflection from the side diverter panel, the objects continue to rise by their buoyancy guided towards an opening with a door used only for backup into the third chamber by a second upwardly sloping top deflection panel.

11. The circulation system of claim 1, wherein the top and side diverter panel is designed and adjusted for providing the maximum angle for divergence.

12. The circulation system of claim 1, wherein the system further backup is provided comprised of a sensor activated inlet valve in said first chamber for a compressor arranged to inject compressed gas or air into said first chamber creating an equal balance to pressure the water in said second and third chambers to remain at the same high level in case failure of the doors in the second chamber causes the water levels in said second and third chamber to descend back up into the first chamber.

13. The circulation system of claim 1, when the backup system of doors is used in the second chamber wherein said first and second doors are standard, sensor induced, electrically actuated doors; once the spherical objects are inside the second chamber, said first door is closed behind them while said second door is open in front on the attached third chamber combining the two bodies of water, the closed door between first and second chambers acts as a stop to prevent the descent of the water into the first chamber and the equalization of the water level.

14. The circulation system of claim 1, wherein a hydraulic punch is located on the side at the top of the third chamber to push the spherical objects onto a holding platform in said third chamber if said spherical objects are unable to make a jump high enough to bounce off the diverter onto the platform.

15. The circulation system of claim 1, when the hydraulic punch becomes inefficient wherein said third chamber has an inlet for water or liquid to permit the chamber to be filled with water or liquid forcing the objects to rise towards the wall above the standby door separating said first and third chambers using a second sloping diverter panel.

16. The circulation system of claim 1, when the hydraulic punch is not used and liquid is filled in the top of third chamber to raise the buoyant objects into the top platform area, wherein a drain and a liquid or water pump are provided to release the liquid or water to lower the spherical objects below the top sloping diverter panel down towards the door between said third chamber and first chamber.

17. The circulation system of claim 1, wherein said two standby standard, sensor induced, electrically actuated with counter weights entry doors are located at the top of the second chamber as a backup system in case there is a malfunction of the two doors in the first chamber, said electrically actuated entry doors open and close and act as a transfer chamber maintaining the high water level in chamber three and when air compression is used maintaining the vacuum in the first chamber and the third chamber to prevent the equalization of the water level in the system.

18. The circulation system of claim 1, wherein some of the electricity generated in this system will be used to operate the entry and exit doors including sensors in said first, second and third chambers.

19. The circulation system of claim 1, wherein batteries or a power grid are provided for storing the produced electricity.

* * * * *